June 24, 1930.　　R. N. ANDERSON　　1,767,910
LISTER PLANTER
Filed July 13, 1927　　3 Sheets-Sheet 2
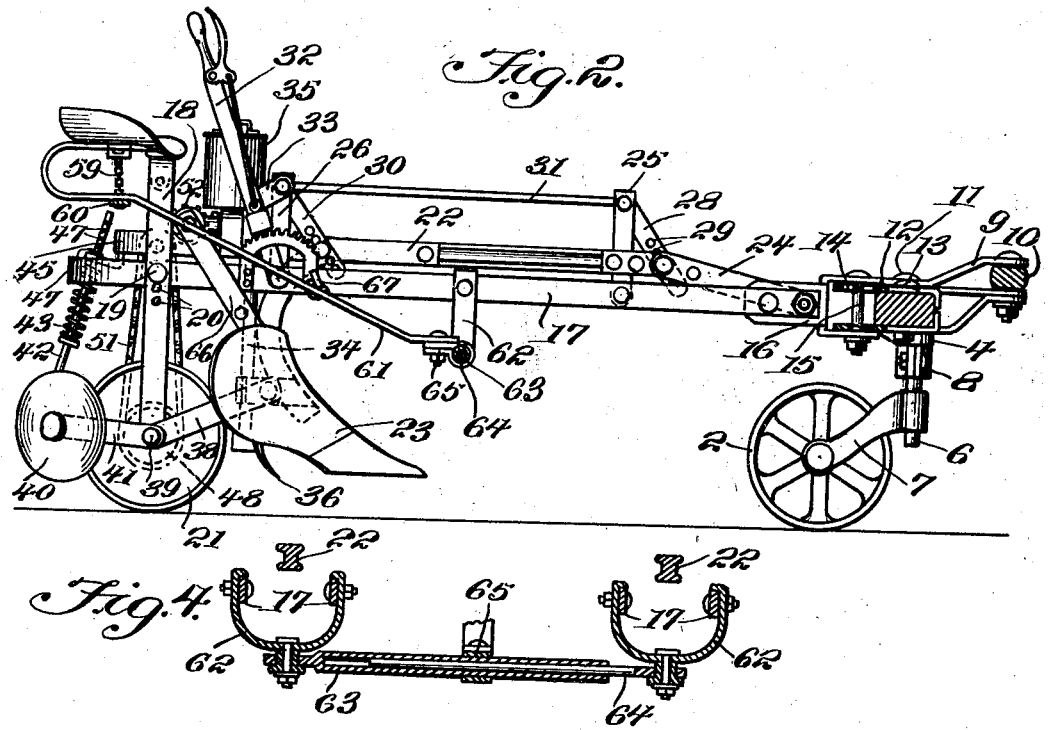
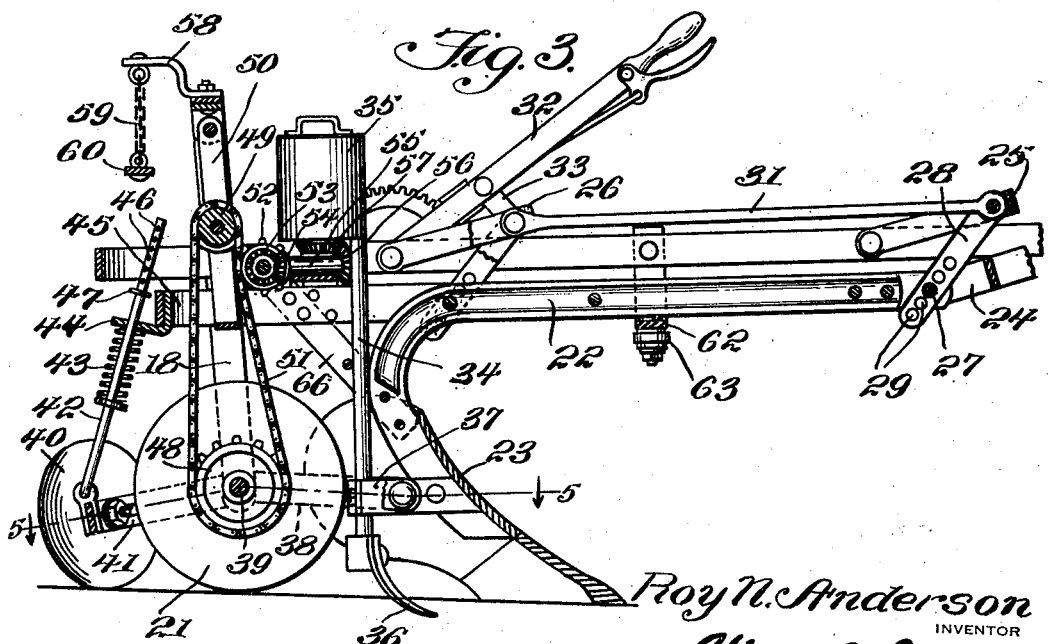

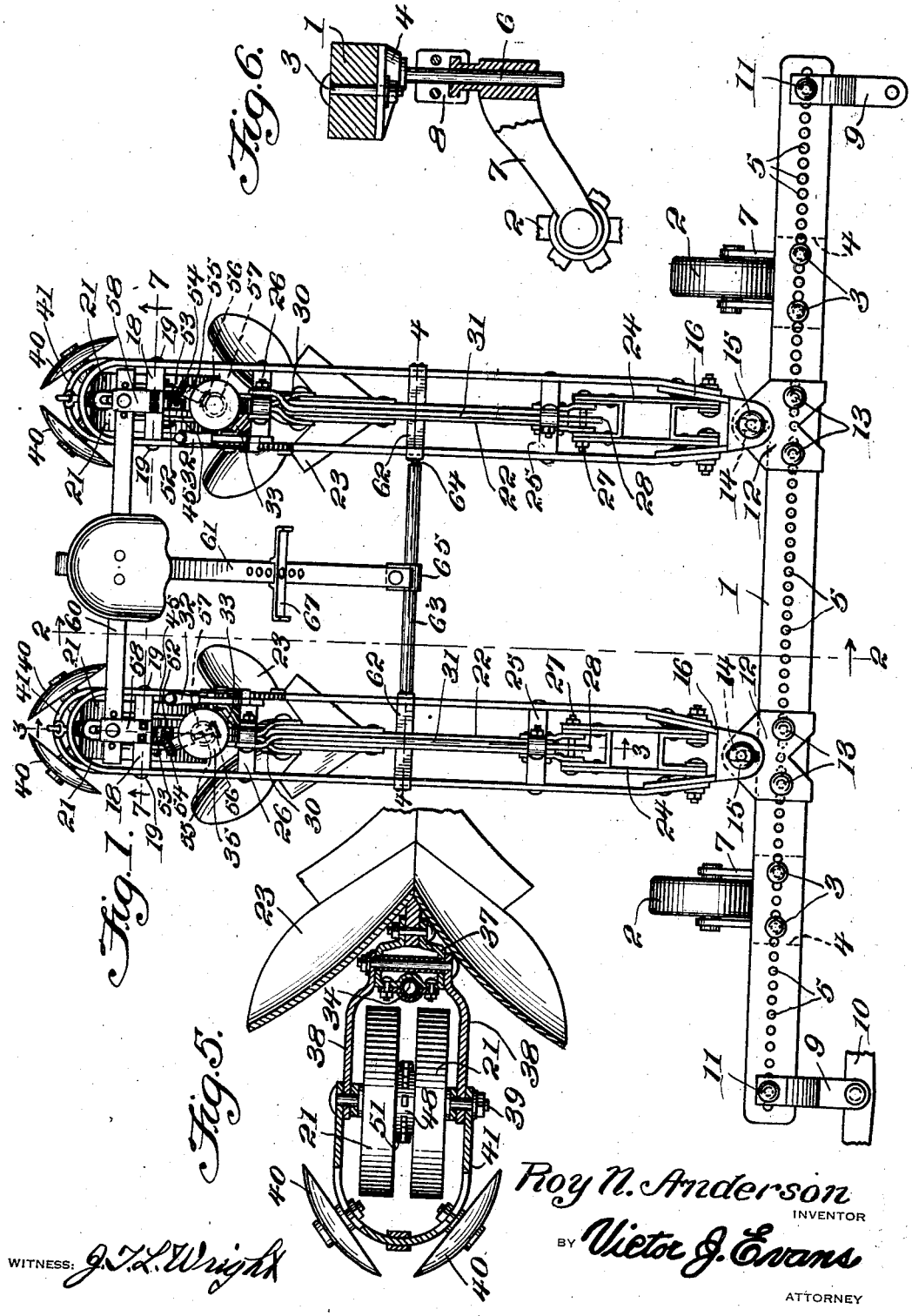

June 24, 1930. R. N. ANDERSON 1,767,910
LISTER PLANTER
Filed July 13, 1927 3 Sheets-Sheet 3
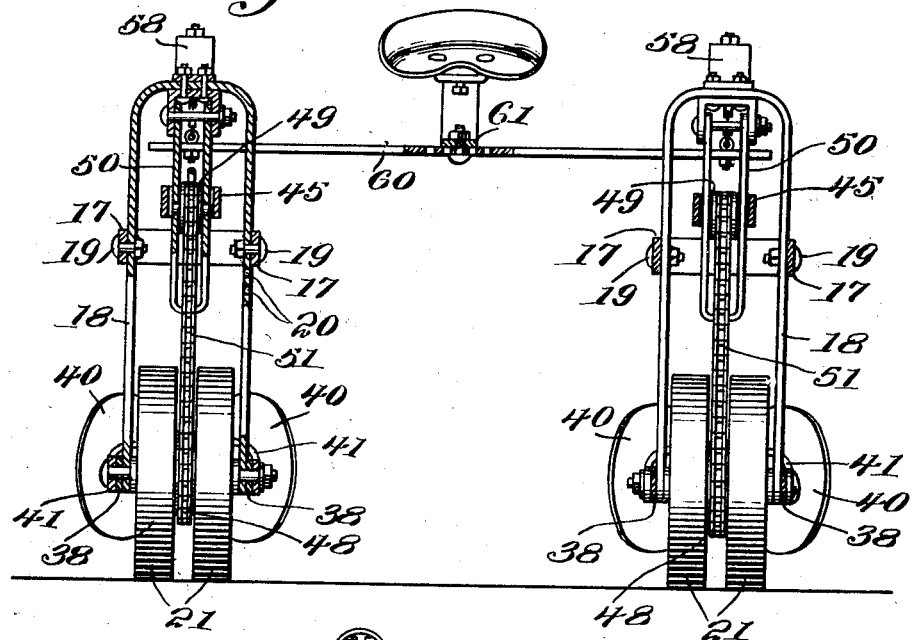
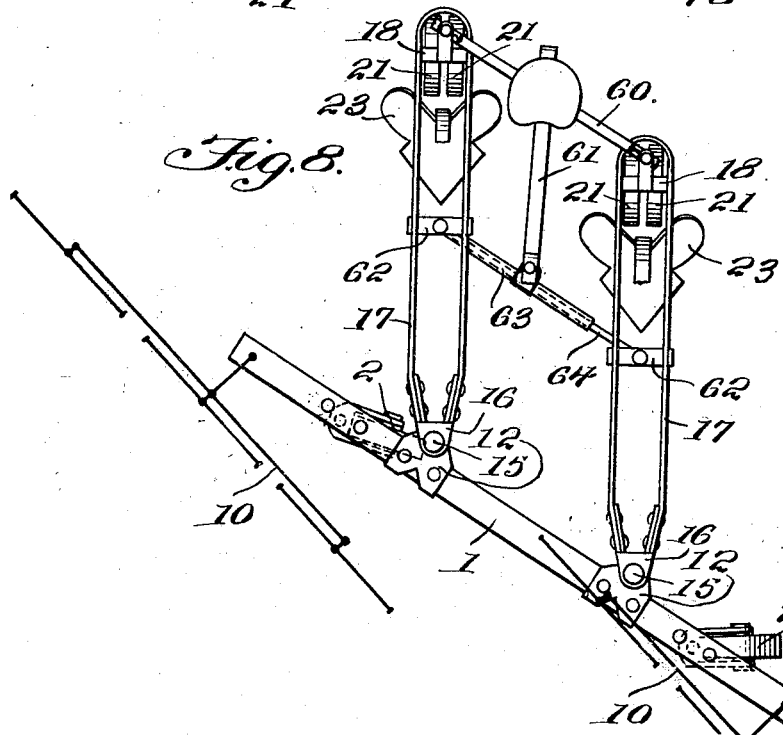
Roy N. Anderson
INVENTOR
BY Victor J. Evans
ATTORNEY
WITNESS: J. T. L. Wright Patented June 24, 1930

1,767,910

UNITED STATES PATENT OFFICE

ROY N. ANDERSON, OF CLOVIS, NEW MEXICO

LISTER PLANTER

Application filed July 13, 1927. Serial No. 205,517.

This invention relates to a lister planter, the general object of the invention being to provide an implement of high efficiency, low price, simple of operation and adjustment, light draft and one which will plant a uniform depth, irrespective of the condition of the surface over which it is traveling.

Another object of the invention is to so arrange the parts that the machine can be used as a single or double row lister and planter and by adding other units, can be used to plant three or more rows, and as the units are adjustably connected to a draft bar, they can be set to plant rows of any desired width.

Another object of the invention is to provide means whereby the units will always remain parallel to each other and to so arrange the vertical adjustment means that the bottom remains at the same angle and has the same suction effect at all depths.

A further object of the invention is to so arrange the units that they will work independently of each other so that one unit can be raised into inoperative position without affecting the operation of the other unit.

Another object of the invention is to arrange the parts so as to eliminate side draft and also to eliminate wheels at the sides of the implement to prevent clogging of the implement by weeds and trash.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the implement.

Figure 2 is a section on line 2—2 of Figure 1.

Figure 3 is a section on line 3—3 of Figure 1.

Figure 4 is a section on line 4—4 of Figure 1.

Figure 5 is a section on line 5—5 of Figure 3.

Figure 6 is a vertical sectional view showing the means for connecting the caster wheel to the draw bar.

Figure 7 is a section on line 7—7 of Figure 1.

Figure 8 is a diagrammatic plan view showing how the implement operates on a turn.

In these views, 1 indicates a draw bar of considerable length which is supported by the caster wheels 2, these wheels being adjustably connected with the draw bar by having the bolts 3 which connect the bracket 4 of each wheel with the bar arranged to pass through any pair of a plurality of holes 5 which extend throughout the length of the bar. Each bracket is provided with a depending part 6 to which the hanger 7 of each wheel is adjustably connected by the clamp 8 which is slotted to rotatably receive a part of the hanger. The connecting straps 9 for the eveners 10 are also adjustably connected with the draw bar by having their bolts 11 arranged to pass through any of the said holes 5. As shown, I prefer to make these straps in sets of three each.

A U-shaped bracket 12 is used to connect each lister unit with the draw bar, this bracket embracing the bar and being connected thereto by the bolts 13 which pass through the holes 5 so that these brackets are also adjustably connected with the bar. The limbs of each bracket extend beyond the rear edge of the bar and the top limb is formed with a slot 14, the other limb being provided with a hole, the slot and hole receiving a bolt 15 which also passes through the overlapping limbs of a member 16 forming the front part of the frame 17 of the lister unit. Thus each lister frame 17 is so connected with the draw bar that it has rocking movement about a vertical axis and through means of the slot 14, it has limited rocking movement in a vertical plane. Each frame 17 is of considerable length and is of substantially U-shape and a vertically arranged substantially U-shaped frame 18 is adjustably connected with the rear part of each frame 17 by means of the fasteners 19 which pass through the side members of the frame 17 and through any one of a number of holes 20 formed in the limbs of the frame 18. A pair of spaced wheels 21 are journaled in the lower end of the frame 18, these wheels acting as supports for the rear part of the lister unit.

The beam 22 of the bottom 23 is pivoted at its front end to a small frame 24 which is in turn pivoted to the front end of the main frame 17. A pair of upright members 25 and 26 are pivoted to the main frame 17 and the front member 25 is adjustably connected to the pivot pin 27 which pivots the beam to the small frame 24 by the link 28 which is provided with a plurality of holes 29, anyone of which is arranged to receive the pin 27. A link 30 connects the rear member 26 with the rear part of the beam in the same manner. A link 31 connects the upper ends of the members 25 and 26 together and a hand lever 32, pivotally connected with the frame 17, is connected with the member 26 by a link 33. Thus by manipulating the hand lever, the bottom and its beam are raised and lowered bodily and without changing the angle of the bottom relative to the ground so that the suction created by the bottom passing through the soil remains the same at all depths to which the bottom is adjusted by the hand lever. By raising the bottom and the beam to the full extent, the bottom will be raised above the ground.

As will be seen, the twin wheels 21 are arranged immediately in rear of the bottom so that they travel in the bottom of the furrow made by the plow 23 and the seed spout 34 from the seed hopper 35 is arranged to drop the seed immediately in front of the space between the two wheels 21, so that said wheels will not pass over the seeds. A small furrow is made in the bottom of the furrow left by the plow 23 by the usual sub-soiler or plow 36 arranged in front of the discharge end of the spout 34. The lower part of the spout is attached to a bracket 37 which is fastened to the rear part of the plow 23 and arms 38 have their front ends pivoted to said bracket and their rear ends pivoted to the sides of the frame 18, preferably by the shaft 39 on which the hub of the wheels 21 is rotatably mounted. These arms 38 movably connect the plow and its associated parts with the lower end of the frame 18 and the covering disks 40 are carried by a U-shaped bar 41 which has its ends pivotally connected with the shaft 39 so that these covering disks are also movably supported by the frame 18. The usual rod 42 and spring 43 are provided for yieldingly holding the covering disks in the soil. The rod 42 passes through a hole in a bracket 44 connected with the end of a U-shaped extension 45 at the rear of the beam 22 and has a plurality of holes 46 in its upper end, any one of which is adapted to receive a pin 47 which will be engaged by the bracket 44 when the beam is lifted so that the covering disks will move upwardly with the beam when the same is raised. Thus the seating mechanism, the main plow 23, the sub-soiler 36 and the covering disks are all raised and lowered by the manipulation of the lever 32.

A sprocket 48 is arranged between the wheels 21 and rotates with said wheels and a small sprocket 49 is carried by a hanger 50 which is pivotally supported at the upper end of the vertical frame 18. A chain 51 passes over these sprockets and this chain also engages a sprocket 52 carried by the extension 45, when the beam 22 and its associated parts are in lowered position, but when the parts are in raised position, the sprocket 52 will pass above the sprocket 49 so that the chain will not engage said sprocket 52. The sprocket 52 is associated with a gear 53 which meshes with a gear 54 on a stub shaft 55 which is carried by the extension 45 of the beam 22 and which also carries a gear 56 which meshes with a gear 57 on the shaft of the seed plate of the hopper 35 so that this plate is rotated when the parts are in lowered position, but the plate will not be rotated when the parts are in raised and inoperative position.

A bracket 58 depends rearwardly from the top of frame 18 of each unit and a flexible member 59 is supported by each bracket. A bar 60 has its ends adjustably connected with the flexible members and the upper end of a seat supporting bar 61 is connected with the central part of said bar 60. A U-shaped bracket 62 is connected with each frame 17 and depends therefrom and a tubular bar 63 is pivotally and movably connected with the bight of one bracket 62 while a rod 64 is attached to the other bracket 62 in the same manner. The bar or rod 64 is slidably arranged in the bar 63 so as to provide a telescopic connection between the two units and the lower end of the seat supporting bar 61 is fastened to the tubular bar 63, as shown at 65. The brackets 62 not only act as supports for the telescopic connection, but also strengthens the main frame 17. The telescopic connection maintains the units in parallel relation as the implement is being turned, as shown in Figure 8.

I may provide braces 66 for connecting the lower end of the beam 22 with the extension 45 and the combined sprocket and gear 52 and 53 may be carried by the upper ends of these braces. I also provide an adjustable foot rest 67 on the bar 61 for the feet of the operator.

From the foregoing it will be seen that the lister frames are pivotally supported at their front ends by the draft bar which is carried by the caster wheels and the rear ends of the frames are supported by the twin wheels which follow the bottom or plow so that the plow or bottom will operate a uniform depth irrespective of the condition of the surface over which the implement is passing, as there are no side wheels to cause the plow or bottom to raise and lower, as said side wheels pass over uneven surfaces. The absence of such side wheels also leaves the implement free of projections which would act to collect trash, weeds and the like and thus interfere with the operation of the implement. The depth at which the bottom or plow operates is controlled by the hand lever and by having the beam and the bottom bodily movable, the bottom is not tilted or inclined as it is adjusted, so that the suction remains uniform at all depths. The hand lever is also used to entirely raise the bottom to raise it above the ground and attention is called to the fact that the feeding means, including the sub-soiler and the covering disks, move with the beam. By having the units connected together as shown, one unit can be moved to inoperative position without interfering with the operation of the other unit so that a single row at the end of a field, for instance, can be planted by the implement without removing one of the units. The arrangement of the seat permits the operator to handle both units as well as direct the horses and he can readily see the operation of the units. The seed is dropped in the furrow made by the sub-soiler at the bottom of the furrow made by the main plow and by making the wheels in pairs, there is no danger of this furrow being entered by the wheels as the wheels pass on each side of the furrow. This furrow is then covered by the covering disks which are adjustably connected with their supports, as shown. The units are adjustable on the draw bar to any width of rows and the caster wheels, as well as the evener connections are also adjustable on the draw bar so that the wheels and horses, as well as the units, can be arranged to suit the condition of the field being planted. As before stated, other units can be added to the draw bar and the manner of connecting the units with the draw bar and with each other will cause the units to remain parallel to each other at all times and even when the implement is being turned.

What I claim is:—

1. An agricultural implement of the class described comprising a draw bar, caster wheels supporting the same and a number of lister units pivotally connected with the draw bar so that they can move about vertical axes, each unit comprising a frame having its front end pivoted to the draw bar, a wheel supporting the rear end of the frame, and a cross bar having its ends pivotally connected with the rear ends of the frames.

2. An agricultural implement of the class described comprising a draw bar, caster wheels supporting the same and adjustable lengthwise on the bar, a number of lister frames having their front ends pivotally connected with the draw bar, a wheel supporting the rear of each frame, a cross bar having its ends pivotally connected with the rear ends of the frames, and means whereby the pivotal ends of the frames can be adjusted lengthwise on the draw bar.

3. In a lister planter, a frame, a wheel supporting the rear end thereof, a lister plow and beam adjustably supported in the frame with the plow in front of the wheel, manually operated means for adjusting the beam and plow vertically, seed dropping means associated with the beam and plow and arranged to deposit the seed in front of the wheel and in rear of the plow, covering means associated with the movable beam and arranged in rear of the wheel, a plow arranged in front of the discharge end of the seed dropping means for making a furrow in the bottom of the furrow made by the main plow and said wheel being formed in two sections spaced apart so that they will pass one on each side of the small furrow, and the seed therein.

4. In a lister planter, a supporting frame having its front end supported by a part of the planter, a wheel for supporting the rear of the frame, said wheel being formed in two sections spaced apart, a plow beam, a small frame pivoted to the front end of the beam at its rear and having its front end pivoted in the main frame, a pair of members pivoted to the main frame, a link connecting the front member with the pivotal point of the small frame with the beam, a link connecting the rear member with a rear part of the beam, a link connecting the two members together, a hand lever pivoted to the main frame and connected with the rear member for moving the beam and its plow vertically, said plow being arranged in front of the wheel, a seed hopper associated with the beam and having its spout located in front of the space formed by the sectional wheel and covering means associated with the beam and arranged in rear of the wheel.

5. In a lister planter, a main frame having its front end connected with a part of the planter, a wheel supporting the rear of the frame, a beam and its plow, means for bodily moving the beam and plow with respect to the main frame, a seed hopper associated with the beam and having its spout depending downwardly in rear of the plow and in front of the wheel, covering means associated with the plow and arranged in rear of the wheel, means for rotating the seed plate of the hopper, a sprocket connected with the wheel, a hanger carried by the main frame, a sprocket therein, a chain passing over the sprockets and a sprocket associated with the seed plate operating means and engaged by the chain when the plow and the beam are in lowered position but when the parts are in raised position, said sprocket will be out of engagement with the chain.

6. In a lister planter, a draw bar having a longitudinally extending row of holes therein, a pair of caster wheels for supporting the bar, each wheel including a bracket and bolts for connecting the bracket with the bar, the bolts passing through some of the holes in the bar, other brackets adjustably mounted on the bar by having their bolts passing through some of the holes, evener connectors adjustably connected with the bar by having their bolts passing through some of the holes and a lister planter unit pivoted to each of the second mentioned brackets.

7. In a lister planter, a draw bar, a number of lister frames, each having its front end pivotally connected with the draw bar, a wheel supporting the rear end of each frame, a beam and its plow vertically movable in each frame with the plow arranged in front of the wheel, a telescopic connection between the two frames, a cross bar, a flexible member connecting each end of the cross bar with a part at the rear of each lister frame, a seat carrying bar connected with the center of the telescopic member and with the center of the cross bar and a hand lever on each frame and arranged adjacent the seat for adjusting the plow beam.

In testimony whereof I affix my signature.

ROY N. ANDERSON.